No. 623,074. Patented Apr. 11, 1899.
F. R. CHAMBERLAIN.
MEANS FOR JOINING ENDS OF INNER TUBES OF PNEUMATIC TIRES.
(Application filed Dec. 17, 1898.)
(No Model.)
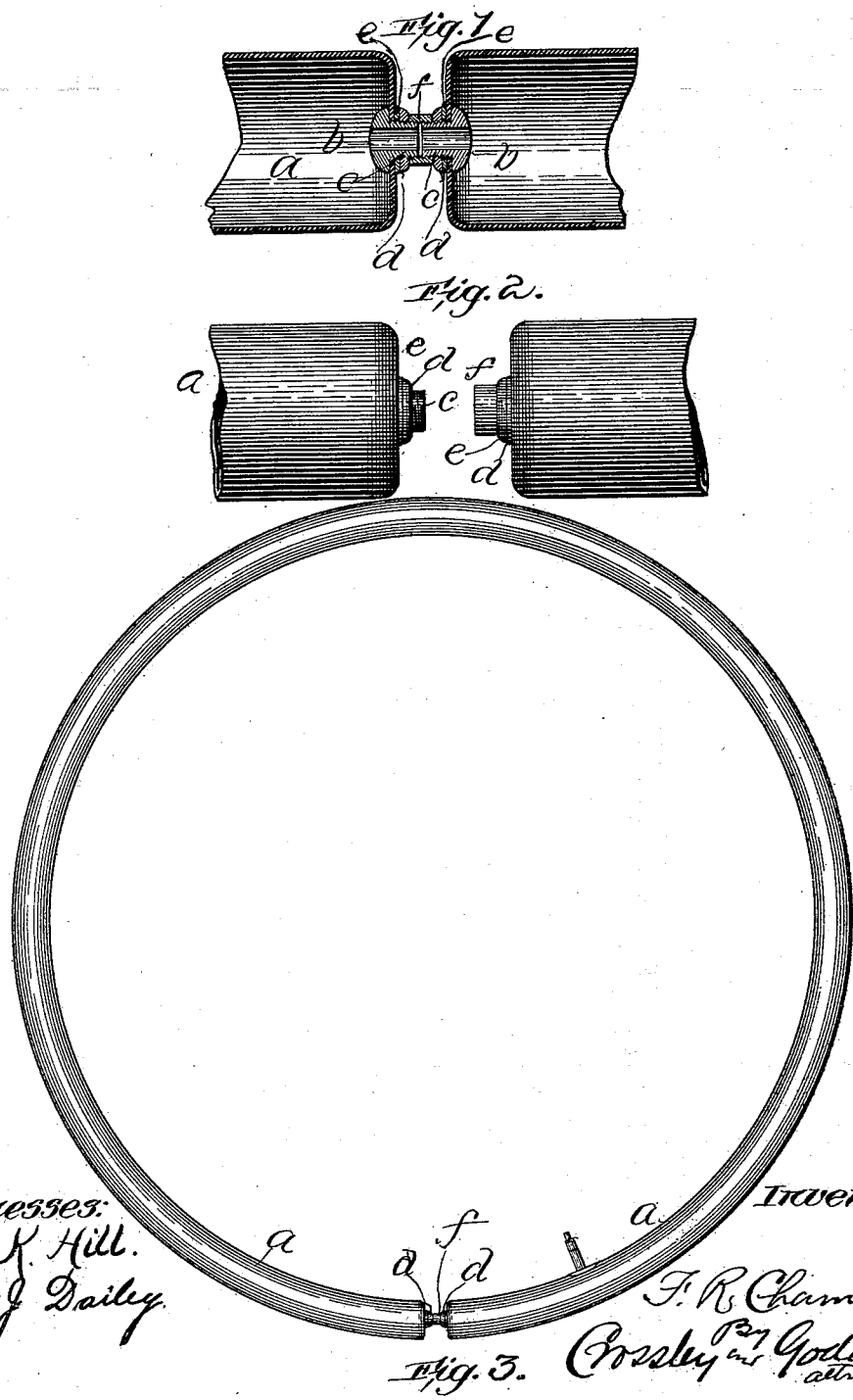

UNITED STATES PATENT OFFICE.

FRANK R. CHAMBERLAIN, OF NEWTON, MASSACHUSETTS, ASSIGNOR TO THE NEWTON RUBBER WORKS, OF SAME PLACE.

MEANS FOR JOINING ENDS OF INNER TUBES OF PNEUMATIC TIRES.

SPECIFICATION forming part of Letters Patent No. 623,074, dated April 11, 1899.

Application filed December 17, 1898. Serial No. 699,559. (No model.)

*To all whom it may concern:*

Be it known that I, FRANK R. CHAMBERLAIN, of Newton, (Upper Falls,) in the county of Middlesex and State of Massachusetts, have invented certain new and useful Improvements in Means for Joining the Ends of Inner Tubes of Pneumatic Tires, of which the following is a description sufficiently full, clear, and exact to enable those skilled in the art to which it appertains or with which it is most nearly connected to make and use the same.

This invention has relation to the so-called "inner" or "air-tight" tubes which enter into the construction of pneumatic bicycle-tires.

It is the object of the invention to provide an improved means for connecting the ends of inner tubes so that they shall to all intents and purposes form a complete ring or circle. Many methods or plans have been resorted to for this purpose, common among which has been the lapping, telescoping, and otherwise splicing the ends, in all of which cases it has been found difficult to maintain the parts in proper relationship and at the same time form a good connection, to say nothing of the difficulty in performing the work.

It is well known that as commonly constructed the outer tube or sheath is made endless and has a slit formed longitudinally through its inner side through which the inner tube is inserted, the ends of the inner tube being subsequently connected or joined. This manner of joining the ends adds to the difficulty of the work. By this invention the difficulties and objections mentioned are overcome and an easily-manipulated and a highly-efficient joint or coupling is provided.

To these ends the invention consists of a coupling for the ends of an inner tube for a bicycle or other vehicle comprising in its construction a metallic coupling part affixed to each end of the tube in such manner as to hold the edges of the ends against the escape of air and so that the two coupling parts may be joined by a screw-and-nut connection or other means that will accomplish the result aimed at. It is preferred that there should be an opening through the coupling, though this is not essential.

Reference is to be had to the annexed drawings and to the letters marked thereon, forming a part of this specification, the same letters designating the same parts or features, as the case may be, wherever they occur.

Of the drawings, Figure 1 is a longitudinal sectional view of the ends of an inner tube for a bicycle-tire provided with my improved coupling means, showing the ends of the tube as coupled or connected. Fig. 2 is a view similar to Fig. 1, but showing the ends of the tube and the coupling members in elevation and the members or ends as disconnected. Fig. 3 is a side elevation of the inner tube of a bicycle-tire, drawn to a smaller scale than is represented in Figs. 1 and 2, showing the ends as provided with my improvements and as joined.

In the drawings, $a$ represents the inner tube of a bicycle-tire, which may be composed of rubber or other substance capable of being inflated to the desired extent and also capable of taking such form as it may be desired to impart to it. As is clearly shown in Fig. 1, each end of the tube $a$ is provided with a coupling member consisting of a head or button $b$, as it were, having a flat surface on its inner side and provided with a nipple $c$, extending from said flat inner side. The nipple $c$ is represented as screw-threaded in each case, and each member has a washer $d$ screwed upon the nipple and against the gathered-in edges of the end of the tube $a$ in such manner as to clamp the said edges of the ends of the tube between the flat inner surface of the head $b$ and the washer $d$. I have also shown a packing-ring $e$ as interposed between the washer $d$ and the edges or inner end of the tube $a$, so as to the better clamp the edges of the tube between the screw-threaded washer $d$ and the flattened inner side of the head $b$.

$f$ designates an internally-screw-threaded thimble which is adapted first to screw upon one of the nipples $c$ of one of the coupling members and then to have the other nipple screwed into the opposite end of said thimble, or the thimble may be turned upon the nipples of both members at the same time. It is obvious that the screw-thread on one nipple is "right hand" in form and that on the other is "left hand," while the screw-thread on the interior of the collars is accordingly right and left hand.

It has been preferred to have an opening $g$ through the nipples and members, so that air communication from one end of the tube to the other end may be had. However, this is not essential, since it is obvious that the connecting or coupling means may be made solid.

The essential thing or end aimed at in my invention is to provide each end of the inner tube with a metallic coupling member, so that when the tube is inserted in the tire, as has been indicated hereinbefore, the coupling members may be screwed together or connected in an air-tight manner, and so, also, as that said coupling members may hold the edges of the ends of the tube likewise in an air-tight manner. Various means have been contrived for reaching this end; but the mechanical devices shown in the drawings have been found to meet the requirements of the ends aimed at.

In molding the inner tube the ends may be turned over, so that the edges of the ends may normally form a smaller opening than the diameter of the tire. This construction not only facilitates the screwing of the coupling members upon the ends of the tire, but it assists in bringing the ends nearer together than would otherwise be the case.

It is obvious that the coupling means between the ends may be shortened materially from that represented in the drawings; but it has been considered best to show the invention as has been done in order the better to explain its nature and design. However, with the ends separated as far apart as shown in the drawings no appreciable effect is exerted upon the tire when completed and inflated.

Having thus explained the nature of the invention and described a way of constructing and using the same, though without attempting to set forth all of the forms in which it may be made or all of the modes of its use, it is declared that what is claimed is—

1. A coupling for the ends of the inner tube of a bicycle-tire consisting of two members, each provided with a head $b$ having a flat inner face and a screw-threaded nipple, the screw-thread on one nipple being the reverse of that on the other, a screw-thread washer $d$ on each nipple between which and the flat inner surface of the head $b$ the edges of the end of the tube are adapted to be clamped, and an internally right-and-left screw-threaded thimble $f$ to connect the same, as set forth.

2. The combination, with an inner tube of a bicycle-tire having ends molded in turned-over form to form a smaller opening in the end of the tube than the diameter of the body of the same, of a device for coupling said ends consisting of two members, each provided with a head $b$ having a flat inner face and a screw-threaded nipple, the screw-thread on one nipple being the reverse of that on the other, a screw-threaded washer $d$ on each nipple between which and the flat inner surface of the head $b$ the edges of the end of the tube are adapted to be clamped, and an internally right-and-left screw-threaded thimble $f$ adapted to be turned upon the nipples to connect the same, as set forth.

In testimony whereof I have signed my name to this specification, in the presence of two subscribing witnesses, this 23d day of November, A. D. 1898.

FRANK R. CHAMBERLAIN.

Witnesses:
FRANK E. HALL,
G. EDWIN ALDEN.